Figure 1:
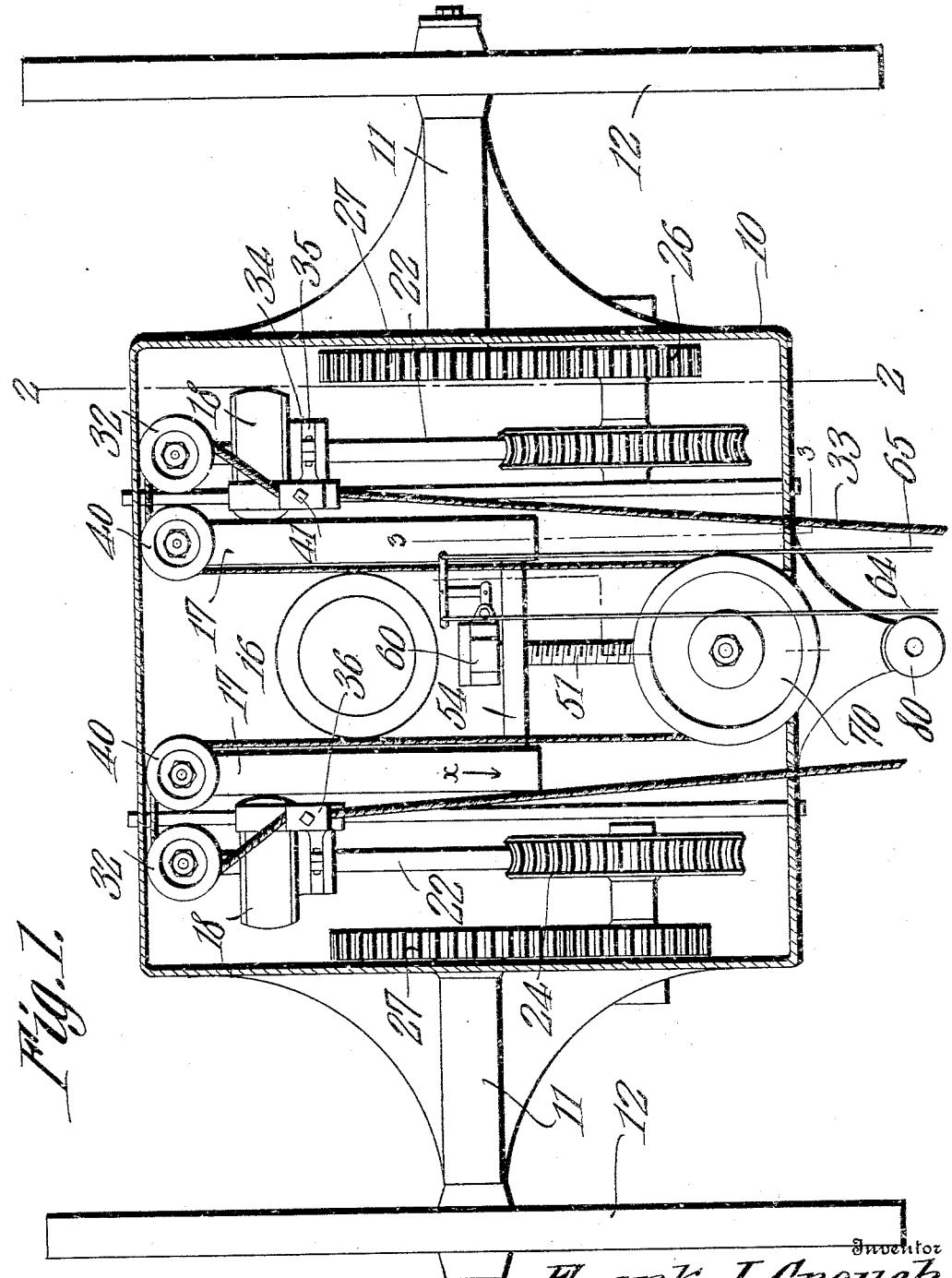

F. J. CROUCH.
TRACTION MOTOR.
APPLICATION FILED AUG. 5, 1908.

961,756.

Patented June 21, 1910.
3 SHEETS—SHEET 1.

Witnesses

Inventor
Frank J. Crouch.
By C. A. Snow & Co.
Attorneys

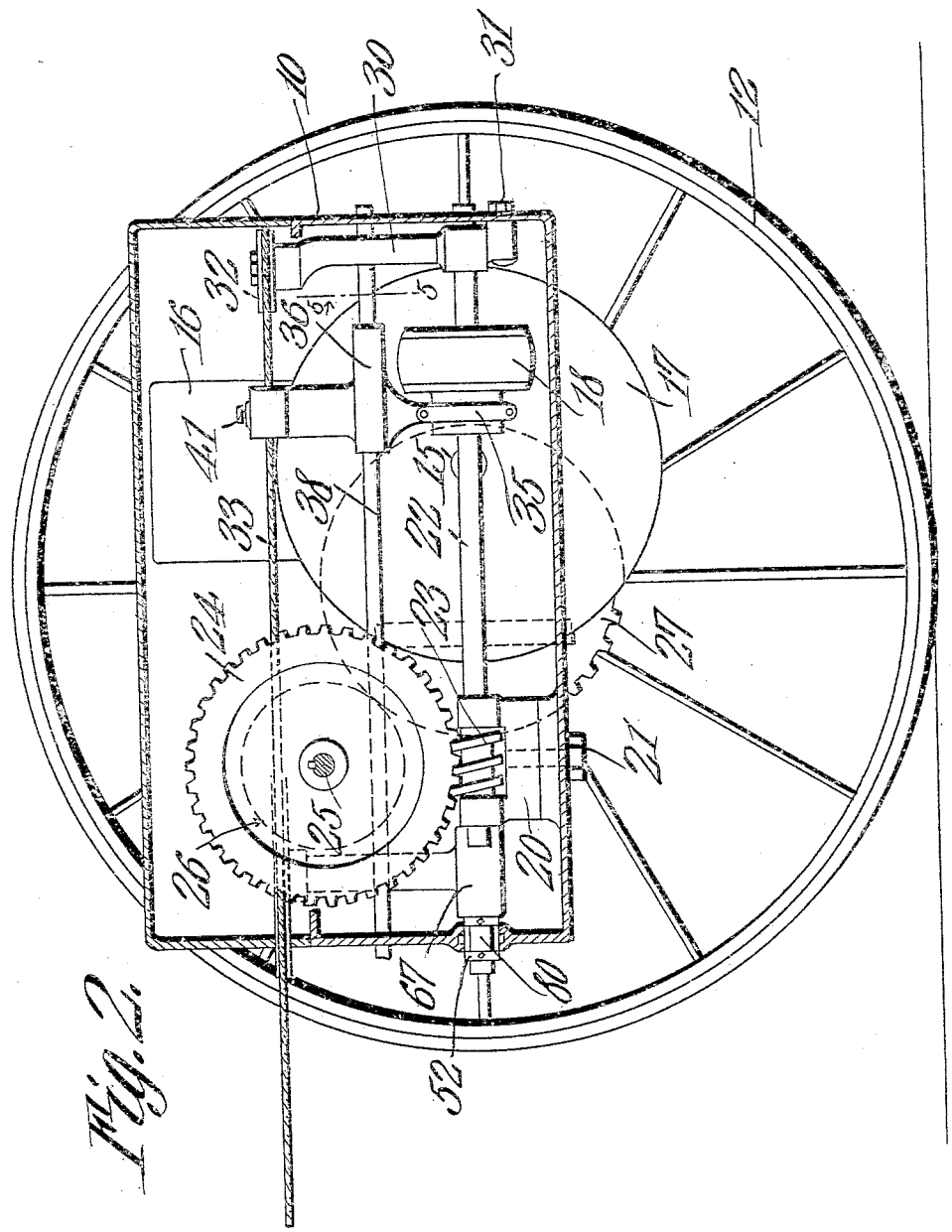

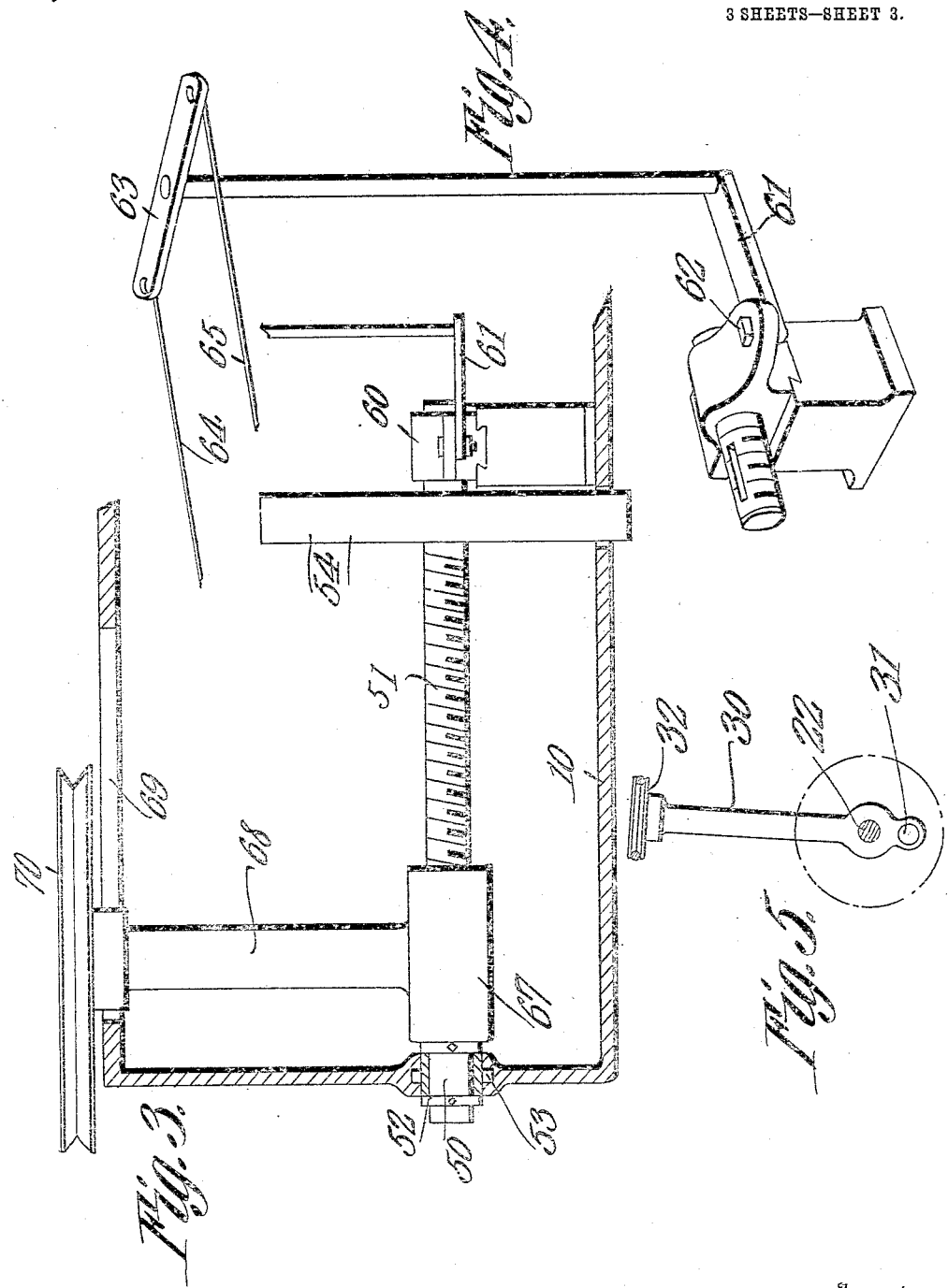

UNITED STATES PATENT OFFICE.

FRANK J. CROUCH, OF SEATTLE, WASHINGTON, ASSIGNOR OF ONE-HALF TO CHARLES P. CHURCH, OF PORTLAND, OREGON.

TRACTION-MOTOR.

961,756.  Specification of Letters Patent.  Patented June 21, 1910.

Application filed August 5, 1908. Serial No. 447,103.

*To all whom it may concern:*

Be it known that I, FRANK J. CROUCH, a citizen of the United States, residing at Seattle, in the county of King and State of Washington, have invented a new and useful Traction-Motor, of which the following is a specification.

The principal object of the present invention is to provide a motor mechanism to take the place of a traction engine or animal power in the drawing of vehicles, or in the operation of agricultural machinery or the like, the device being so constructed and arranged that it may be coupled on at the front of any vehicle or machine which is to be operated and controlled in the same manner as a draft animal, so as to operate at any desired speed; to move to the right or left, or to back.

A further object of the invention is to provide a motor device of this type that is wholly self contained and which may be controlled by an operator located in the distance, as, for instance, by a person on the following vehicle or machine being operated.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional plan view of a motor mechanism constructed in accordance with the invention. Fig. 2 is a vertical sectional view of the same on the line 2—2 of Fig. 1. Fig. 3 is a longitudinal sectional view of a part of the device, on the line 3—3 of Fig. 1. Fig. 4 is a detail perspective view of a portion of the steering mechanism. Fig. 5 is a detail section on the line 5—5 of Fig. 2.

Similar numerals of reference are employed to indicate corresponding parts throughout the several figures of the drawings.

The working parts of the motor are mounted within a suitable casing 10 that is provided with laterally extended side brackets forming bearings for the reception of a pair of alined axle members 11, to the outer ends of which are secured traction wheels 12. The axles are wholly independent of each other and may be driven at different speeds, respectively, for the purpose of turning the vehicle to the right or to the left.

Mounted in suitable bearings in the forward central portion of the frame is a main shaft 15 forming the crank shaft of an engine 16, it being understood that the engine here shown is merely typical and any form of single or mutiple cylinder engine may be employed. On the opposite ends of the crank shaft are secured two balance wheels 17, of equal weight and diameter, the outer surfaces of these wheels being provided with disks of paper or other suitable material and forming friction driving surfaces from which motion is imparted through small friction disks 18 and intervening mechanism to the two traction wheels 12.

Arranged in the lower rear portion of the casing at a point near each side thereof is a bearing bracket 20 that is mounted on a vertical bolt 21 on which it is free to rotate, and said bracket carries bearings for the reception of a worm shaft 22 carrying a worm 23 that intermeshes with a worm wheel 24 secured to a short shaft 25 that is journaled in the upper portion of the frame. This shaft 25 carries a pinion 26 that intermeshes with a gear 27 at the inner end of the wheel shaft 11, so that if motion is imparted to the shafts 22 at the same speed, the two draft wheels will be rotated at the same speed, and the motor will travel along in a straight line, but if one shaft is rotated faster than the other, the motor will be turned to the right or left as the case may be.

The forward end of each shaft 22 is mounted in a bearing formed in a vertically extending arm 30, the bearing being located a short distance above a carrying pin 31 on which the arm is pivoted, and at the upper end of this arm is mounted a sheave 32 for the passage of a controlling rope or cable 33. The shaft 22 is provided with a feather fitting within a feather way formed in the friction disk 18, so that the disk may be moved in the direction of the length of the shaft in order to engage at any point on the outer surface of the balance wheel 17, the greater the distance from the axis of the latter, the greater the speed at which the shaft 22 is driven, and when the disk 18 is moved from one side of the center to the other, the direction of rotation of the shaft will be reversed.

The hub of the disk 18 is provided with an annular groove 34 arranged for the reception of a strap 35 that is hung from the lower end of a bracket 36, the latter being slidably mounted on a guiding rod 38 that is mounted in the casing and is disposed in parallel relation with the axis of the shaft 22. The bracket 36 is arranged to slide in the direction of the length of the guide bar 38 and in so doing will shift the position of the disk 18 for the purpose of altering the speed or the direction of rotation of the motor.

Mounted on a bracket near the forward end of the casing is a guiding sheave 40 around which the rope or cable 33 passes, and said rope or cable extends through an opening that is formed in the upper portion of the bracket 36, and is there firmly clamped by a set screw 41.

It will be observed that from the point of connection with the bracket 36, the rope or cable 33 slopes outward to the guiding sheave 32, so that any pull exerted on the rope or cable in the direction indicated by the arrow $x$ will tend to pull the arm 30 inward toward the center of the machine and this will result in the swinging inward of the forward end of the shaft 22, and movement of the friction disk 18 against the outer face of the driving wheel 17. By this means the operator seated on the following vehicle or agricultural machine may, by pulling on the rope or cable, draw the disk 18 into working engagement with the driving wheel 17 and by exercising different degrees of force, the power transmitted may be increased or decreased as occasion may require.

In the lower rear portion of the center of the casing is arranged a bearing 50 for the reception of the unthreaded portion of a screw 51 that is held from longitudinal movement by a pair of collars 52 rigidly secured to the screw at opposite sides of the bearing. This bearing is mounted on a pin 53 in order to permit slight turning movement in a horizontal plane. The forward end of the screw carries a large friction disk 54 that is arranged to play between the inner faces of the two balance wheels 17, but normally is out of contact with both of said wheels. When occasion requires the friction wheel may be moved into contact with the driving wheel at the right in order to rotate the screw in one direction, or the driving wheel 17 at the left to effect rotation in the opposite direction.

The forward end of the screw is mounted in a slide 60 and one end of the slide is pivotally connected to the horizontal arm of a rock shaft 61 by a pin 62. The upper end of the vertical arm of this shaft carries a pair of arms 63 from which cords 64 and 65 extend rearward to be grasped by the operator, so that the latter may shift the bearing to the right or left in order to effect the engagement of the friction wheel 54 with either of the driving members 17, it being understood that the shaft is journaled in suitable supports within the casing.

Mounted on the screw 51 is a nut 67 from which rises a standard 68, the upper portion of which is guided in a slot 69 at the top of the main frame. At the top of the standard is a sheave 70 around which the central bight of the guiding rope or cable 33 passes.

It will be seen that if the screw is turned in one direction and the sheave thereby moved rearward, the stress on the inner run of the rope or cable will operate to draw the two brackets 36 forward, and thus shift the position of the two friction disks 18 to a point forward of the vertical plane of the axis of the main shaft, this being the normal position when the motor is traveling in a forward direction. This shifting may occur when it is desired to increase the speed by moving the disks 18 a greater distance from the axis of the shaft. When the cord 64 is pulled and friction wheel 54 is shifted into engagement with the right hand wheel 17, the direction of rotation of the screw is reversed and the sheave 70 moves forward so that the operator by pulling on the opposite ends of the line 33 may draw the two friction pulleys 18 backward across the centers of the driving wheels 17 and thereby reverse the direction of rotation of the traction wheels 12 in order to back the motor.

The motor casing is provided with a rearwardly extending bracket 80 for convenience in coupling to the vehicle or machine to be hauled, but any other form of connection may be employed as required, although it is preferred to use a connection that will positively prevent any tilting of the motor casing while the device is in operation.

With a machine constructed in accordance with this invention, it is possible to couple on to any vehicle, agricultural machine, or the like, and by using the ropes or cables 33, 64 and 65 in the manner described, the device may be propelled forward or backward, or its speed changed as desired.

The prime motor 16 is operated continuously, and in order to transmit movement to the wheels 12, it is necessary for the operator to exert certain stress on the ends of the line 33, thereby pulling the friction disks 18 into operative engagement with the outer faces of the wheels 17 and the degree of force exerted in accomplishing this depends on the work. Where the load is heavy the force exerted is greater than where the load is light, but in all cases as soon as the line is slackened the friction disks will drop away from the driving disks and the propelling operation will cease. The sheave 70 having been brought to the desired position, the operator may turn the draft apparatus to either side by pulling on the cable 33 so as to shift one of the friction pulleys 18 nearer the axis of the driving wheel, as will be readily understood. For instance with the parts in the position shown in Fig. 1, if the left hand end of the cable 33 be pulled, the pulley 18 at the left of the apparatus will be drawn rearward toward the center of the driving wheel 17 and the pulley 18 at the right will be moved toward the periphery of the driving wheel. The right hand traction wheel will, consequently, be driven at a higher speed than the left hand wheel and the machine will turn to the left.

What is claimed is:—

1. In a draft apparatus, a frame, a pair of traction wheels supporting the frame, a prime mover including a pair of friction disks, driving connections for each traction wheel, each connection including a driven disk arranged to engage one of the friction disks, shafts carrying said driven disks, levers having bearings for said shafts, and vibrating laterally with respect to the friction disks, and controlling lines extending from the levers rearward of the frame to permit the said levers to be placed in operative engagement with the friction disks.

2. In a draft apparatus, a frame, a pair of traction wheels supporting the frame, a prime mover including a pair of friction disks, driven disks arranged to engage the friction disks, and through which motion is imparted to the traction wheels, a pair of shafts carrying the driven disk, a pair of levers having bearings for the shaft, a flexible actuating member extending around both levers, and means for adjusting said flexible member, whereby the driven disks may be shifted along the length of their carrying shafts.

3. A wheeled draft apparatus, a prime mover carried thereby, a pair of separate driving connections between the prime mover and the wheels, a sheave, a flexible member extending around said sheave and having its ends extending rearward from the motor for distant control, means connected to said flexible member for controlling the driving connections, a traveling nut carrying the sheave, a screw extending through the nut, and means for turning said screw and nut in a direction to shift the position of the nut.

4. A wheeled draft apparatus including a prime mover, friction driving connections between the prime mover and the carrying wheels, each of said driving connections including a friction disk, a shaft carrying the disk, a pivoted lever having a bearing for the shaft, a sheave mounted at one end of the lever, a shifting fork connected to the friction disk, a flexible member connected to both shifting forks and extending around the two sheaves, a sheave around which the bight of the flexible member extends, a traveling nut carrying said sheave, a screw extending through the nut, a slidable bearing for one end of the screw, a friction disk carried by the screw, and a controlling means for shifting the slide and moving the friction disk into engagement with the prime mover.

In testimony that I claim the foregoing as my own, I have hereto affixed my signature in the presence of two witnesses.

FRANK J. CROUCH.

Witnesses:
HARTLEY D. SMITH,
JAMES A. BECKER.